United States Patent [19]
Radici et al.

[11] 4,158,091
[45] Jun. 12, 1979

[54] PROCESS FOR IMPROVING THE STABILITY OF ETHERIFIED ACETAL HOMOPOLYMERS

[75] Inventors: Pierino Radici, Turate; Sergio Custro, Gorla Maggiore; Mario Ermoni, Gorla Minore; Paolo Colombo, Saronno, all of Italy

[73] Assignee: Societa' Italiana Resine S.I.R. S.p.A., Milan, Italy

[21] Appl. No.: 870,148

[22] Filed: Jan. 17, 1978

[30] Foreign Application Priority Data

Jan. 17, 1977 [IT] Italy .................................. 19353 A/77

[51] Int. Cl.² .............................................. C08G 2/36
[52] U.S. Cl. ................................ 528/231; 260/45.7 R; 528/488

[58] Field of Search ...................... 260/67 FP, 45.7 R; 528/231, 488

[56] References Cited

U.S. PATENT DOCUMENTS

| | | | |
|---|---|---|---|
| 3,640,945 | 2/1972 | Ricker et al. ................... | 260/45.7 R |
| 4,024,105 | 5/1977 | Sextro et al. .................. | 260/45.85 R |

*Primary Examiner*—Lucille M. Phynes
*Attorney, Agent, or Firm*—Sughrue, Rothwell, Mion, Zinn and Macpeak

[57] ABSTRACT

The thermal and chemical stability of etherified acetal homopolymers is improved by heat-treating the latter in the molten state at a temperature of at least 180° C., in the presence of a halide of an alkali or alkaline earth metal, until substantially complete degradation of the unstable polyoxymethylene chains.

16 Claims, No Drawings

PROCESS FOR IMPROVING THE STABILITY OF ETHERIFIED ACETAL HOMOPOLYMERS

The present invention concerns a treatment for improving the stability of etherified acetal homopolymers.

Throughout the present specification, the terms "acetal homopolymers" or simply "homopolymers" will be used to refer to those products having a molecular weight of at least 10,000 which are obtained by the polymerization of formaldehyde, or by polymerization of a cyclic oligomer of formaldehyde, chosen from trioxan and tetraoxan. As is known, the polymerization of formaldehyde, or of its cyclic oligomers, yields acetal homopolymers with at least one unstable terminal hydroxyl group per macromolecule.

It is therefore necessary to transform these hydroxyl groups into other more stable groups in order to give the acetal homopolymers the chemical and thermal stability which is indispensable for their processing.

To this end the hydroxyl groups are generally converted into ester groups by reaction with anhydrides or carboxylic acids, and in particular with acetic anhydride, or into ether groups, especially by transetherification, by reaction with dialkyl acetals, ortoesters, ketals and orthocarbonates.

The etherified acetal homopolymers have a greater chemical and thermal stability than those containing ester terminal groups. The thermal decomposition of the ester groups in a nitrogen atmosphere generally occurs between 240° and 260° C., whilst that of the ether groups occurs at 280°–320° C.

There are other valid reasons for preferring to convert the hydroxyl groups of the acetal homopolymers into ether groups. In fact the ester groups are easily hydrolyzed by alkaline reagents. Moreover, the greater resistance of the ether groups to chemical and thermal action makes the choice of those additives and stabilizers which are normally added to the acetal polymers simpler and less onerous.

In practice it is not possible to replace all the thermal hydroxyl groups of the acetal homopolymers by ether groups directly in a one stage reaction.

No matter which etherification process is chosen the etherified homopolymers thus obtained, always contain small amounts of terminal groups differing from the ether groups, and mainly hemiacetal groups ($-CH_2OH$), ester groups (usually formate groups) and orthoester groups ($-CH(OR)_2$).

The hemiacetal groups are those, initially present in the acetal homopolymer, which have not undergone any transformation during the etherification treatment. The known thermal instability of these groups results in a gradual unzippering of the macromolecular chain, with liberation of aldehyde monomer.

The ester terminal groups may be present in the acetal homopolymer prior to the etherification treatment, or may be formed during the said treatment. Their thermal stability is less than that of the ether groups and their thermal decomposition also leads to a degradation of the macromolecular chain in the manner described above. Furthermore the presence of the ester terminal groups renders the acetal homopolymer partially vulnerable to attack by alkaline reagents.

The orthoester terminal groups are formed during the etherification reaction and have a thermal stability, particularly in air, graeter than that of the formate groups, but decidedly less than that of the ether groups.

The decomposition temperature of the orthoester groups is of the order of 195°–200° C. and their resistance to alkaline reagents is less than that of the ether groups.

It is therefore of interest to selectively remove the unstable fraction consisting of polyoxymethylene chains with unstable terminal groups so as to give the said etherified homopolymers the greatest degree of chemical and thermal stability.

One known method of eliminating the unstable fraction of etherified acetal homopolymers consists of treating the said homopolymers with basic compounds, in the presence or absence of polar liquid compounds, at temperatures of from 100° to 240° C., operating in suspension, in solution or in the molten state.

One disadvantage of this method consists of the fact that the presence of basic compounds induces the formation of secondary products, consisting of derivatives of the formaldehyde which is produced, and consequently undesirable colouring. The removal of these secondary products is onerous and usually incomplete given their structure and molecular weight. It is also possible to reduce the colouring phenomenon by operating in aqueous buffer solutions at a pH value of from 10 to 11.2, in the presence of weakly basic compounds which are capable of forming addition products with formaldehyde, such as urea, dicyandiamide and ammonia.

The results thus obtained are nevertheless not wholly satisfactory in that secondary reactions which are damaging to the colour of the acetal homopolymer still occur, albeit to a lesser extent, as a result of the high times and temperatures which are required in view of the low speed of hydrolysis.

By operating according to the method described the necessity of removing the by-products formed by thorough and onerous washing again arises.

Other types of treatment in aqueous mediums near the neutral pH value, such as from 6 to 7.5, are scarcely efficient and result in disadvantages deriving from acidification of the medium as a result of the production of formic acid by hydrolysis and oxidation-reduction of the formaldehyde (Cannizzaro reaction).

According to the present invention, the disadvantages described above are overcome and the unstable fraction of the etherification acetal homopolymers is selectively eliminated.

Thus, the invention provides a process for eliminating the unstable polyoxymethylene chains of an etherified acetal homopolymer, characterized by heat-treating said homopolymer in the molten state at a temperature of at least 180° C., in the presence of one or more halides of alkali metals and alkaline earth metals, for a period such as to ensure substantially complete degradation of said unstable chains.

Preferably, the heat-treatment is carried out at least in part under subatmospheric pressure, for example a pressure of from 15 to 700 mm Hg, to facilitate removal of the volatile degradation products. The heat-treatment is preferably carried out under stirring, thereby improving the removal of the volatile degradation products and avoiding local overheating. The acid halides may be added to, and admixed with said homopolymer before bringing the latter to the molten state, or once said homopolymer is in the molten state.

It is advisable to melt the etherified acetal polymer rapidly and preferably within a period of from 1 to 60 seconds. This may be effected by making use of the possibility of supplying high quantities of energy by means of a machine, such as an extruder.

Extrusion is particularly suitable for achieving the process of the present invention insofar as, besides the fusion of the etherified acetal homopolymer and its homogenization with the halide of an alkali metal or an alkaline-earth metal, it also allows the elimination (degassing) of the volatile components by the application of a pressure lower than atmospheric in one or more zones along the body of the extruder.

One or two screw extruders are useful for this purpose, and the self-cleaning twin-screw extruders are preferable.

In a preferred embodiment the homogeneous mixture is conveyed along the body of the extruder through a plurality of degassing zones with continual renewal of the surfaces of the treated mass, so that the liberated volatile components (in particular formaldehyde) are removed rapidly and local overheating in the said mass is avoided.

The temperature of the mixture during the treatment is generally maintained at values of from 180° to 260° C. and preferably from 180° to 230° C., the particular temperature selected depending on the etherified acetal homopolymers being treated, and on the particular halide chosen, as well as on the characteristics of the apparatus used.

The present invention is based essentially on the use of the alkali and alkaline-earth metal halides to accelerate the attack of the unstable terminal groups of the etherified acetal homopolymers.

The preferred halides are the fluorides and the chlorides of lithium, sodium, potassium and barium.

The said halides are generally used in an amount of from 0.0002 to 0.5% by weight, and preferably in an amount of from 0.001 to 0.05% by weight with respect to the etherified acetal homopolymer. The halides may be added to the etherified acetal polymer in the form of a "master-batch" or dissolved in an appropriate solvent. Solvents suitable for this purpose are those which are volatile at temperatures of 180° C. or more and of all these water is preferred. The etherified acetal homopolymer, in powder form, may be dampened by spraying with the halide solution, or may be dispersed in the solution itself.

The resulting mixture is then fed into the extruder and it is suitable that the content of solvent is not greater than 5%, and preferably 1% by weight.

The halide solution may also be added to the homopolymer once the latter is in the molten state. Thus, the halide solution may be directly added in the extruder in the zone following the compression zone for the etherified acetal homopolymer. In this case the amount of volatile solvent may be of the order of 20% by weight with respect to the etherified acetal homopolymer, although it is more conveniently maintained at values of between 1 to 5% by weight.

The extruder used for the process of the present invention includes one or more zones in which the treated mixture is kept under high pressure and one or more degassing zones at a pressure lower than atmospheric.

These latter zones are generally kept at a pressure of from 15 to 700 mm Hg and in the case of more zones the pressure decreases from each degassing zone to the next.

The total period of time for the treatment is generally from 0.2 to 10 minutes, and preferably from 0.5 to 5 minutes.

In each case the time selected depends on the particular etherified acetal homopolymer to be treated, and on the amount and type of halide used, as well as on the other operative conditions, such as the characteristics of the extruder. By working in the manner described, the unstable fraction is almost completely removed from the etherification acetal homopolymer, and as a result the latter is given high levels of chemical and thermal stability and resistance to colouring. Thus, the fraction unstable to akaline reaction, which before treatment is generally from 0.5 to 30% by weight, is reduced after treatment to values not exceeding 0.2% by weight.

As is known, the alkali-stable fraction is determined by maintaining the etherified acetal homopolymer at 150° C. in solution in benzyl alcohol containing 1% of triethanolamine, for 30 minutes.

The thermal resistance, as well as the chemical resistance, is increased.

Thus, for example, the thermal degradation of etherified homopolymers at 220° C. in a nitrogen atmosphere, expressed in weight loss percent per minute during the first ten minutes, is typically of 0.05–3% before treatment, and of the order of 0.001–0.02% after treatment.

The etherified acetal homopolymer, after the treatment described and the addition of stabilizers, may be processed by usual techniques.

The said stabilizers consist, as is known, of antacid substances, such as urea, dicyandiamide, polyamides and polyester amides, and of antioxidant substances, generally chosen from phenolic compounds such as octadecyl 3-(3',5'-di-tert-butyl-4'-hydroxyphenyl) propionate; pentaerythritol tetra[3-(3',5'-di-tert-butyl-4'-hydroxyphenyl) propionate]; 1,6-di[3-(3',5'-di-tert-butyl-4'-hydroxyphenyl) propionyloxy]-n-hexane; 2,2'-methylene-bis(6-tert-butyl-4-methylphenol); 1,1-di-(5'-tert-butyl-4'-hydroxy-2'-methylphenyl) butane; 1,1,3-tris (5'-tert-butyl-4'-hydroxy-2'-methylphenyl)butane; 4,4'-thio-bis(6-tert-butyl-metal-cresol). The overall amount of stabilizers added is usually from 0.05 to 3% by weight with respect to the etherified acetal homopolymer.

The moment of addition of the said stabilizers is not critical, and according to one embodiment the antioxidant is added to the etherified acetal homopolymer prior to the treatment whilst the other substances are added after the said treatment.

Etherified acetal homopolymers treated in accordance with the present invention, besides having high chemical and thermal stability, maintain their colour characteristics unchanged even after repeated melting.

EXAMPLE 1

A polyoxymethylene homopolymer etherified by reaction with trimethylorthoformate in the presence of dimethylsulphate and having an inherent viscosity of 1.77 dl/g (as measured at 60° C. in a solution in p-chlorophenol with 2% of α-pinene containing 0.5 g of polymer per 100 ml), after the addition of about 0.30% by weight of 1,1,3-tris(5'-tert-butyl-4'-hydroxy-2'-methylphenyl) butane, is subjected to tests to determine the thermal stability ($K_{220}$) and the resistance to alkaline attack (ASF).

$K_{220}$—Percentage loss of weight per minute at 220° C. in a nitrogen atmosphere, for a period of 60 minutes. The determination is carried out on a thermobalance in which the passage of nitrogen ensures the purging of the degradation products.

ASF—A specimen is kept in solution in benzyl alcohol containing 1 wt.% of triethanolamine at a temperature of 150°-152° C., for a period of 30 minutes with a polymer/solvent weight ratio of 1:10; the etherified homopolymer is then precipitated by cooling and, after filtration, is thoroughly washed with methanol and dried; the percentage of polymer remaining is given as the alkali stable fraction (ASF).

The results of the tests are given in Table 1 under POM-1.

The said etherified polyoxymethylene is suspended in an aqueous solution containing 0.03% by weight of sodium fluoride. After filtration, the polymer containing 20.3% by weight of volatile solvent (water) is dried up to a water content (determined by the K. Fisher method) of 0.08% by weight. The sodium fluoride content is therefore equal to 0.0061% by weight.

After the addition of about 0.3% by weight of the antioxidant described above, the polymer is fed into a laboratory twin-screw extruder having a diameter of 28 mm and a length/diameter ratio of 25:1.

The extruder includes the following successive zones: loading, melting, compression, 1st degassing, compression, 2nd degassing, metering.

The first degassing zone is operated at 170 mmHg and the second at 40 mmHg.

The temperatures in the said zones are on average as follows: 190°, 220°, 210°, 210°, 200° and 190° C.

The total residence time in the extruder is on average 40–45 seconds and the melting time is 6–10 seconds.

The extrudate is cooled and transformed into granules of 2×2 mm by means of an automatic cutter.

The white-coloured granules are subjected to tests, the results of which are given in Table 1 under POM-2.

Table 1

|       | $\eta e$ (dl/g) | $K_{220}$ (%/min.) | AFS (%) |
|-------|---------|----------------------------------------------|---------|
| POM-1 | 1.77    | 0.22 up to a loss of 8.9% by weight, 0.05 thereafter | 90.3    |
| POM-2 | 1.76    | 0.015 (constant value)                       | ≧99.8   |

EXAMPLE 2

A polyoxymethylene homopolymer etherified by reaction with triethylorthoformate in the presence of p-toluene sulphonic acid and having an inherent viscosity of 1.21 dl/g, is admixed with 0.25% by weight of pentaerythritol tetra [3-(3',5'-di-tert-butyl-4'-hydroxyphenyl) propionate] and 0.25% by weight of polyvinyl pyrrolidone with a molecular weight of 30,000.

The mixtures is subjected to tests, the results of which are given in Table 2 under POM-3.

The same polymer, containing 0.25% by weight of the above antioxidant, is fed into the twin-screw extruder of Example 1 which operates under the temperature conditions described in the said Example 1.

In the zone which preceeds the first degassing zone, there is introduced a quantity equal to 1% by weight of the polymer of an aqueous solution containing 0.3% by weight of lithium fluoride, whilst in the zone preceding the second degassing zone there is introduced a quantity equal to 1% by weight of the polymer of an aqueoues solution containing 25% by weight of polyvinyl pyrrolidone with a molecular weight of 30,000.

The pressures in the first and second degassing zones are 650 to 70 mmHg respectively.

The average residence time in the extruder is 60 seconds and the average melting time 10–15 seconds.

The polymer, transformed into granules, is subjected to tests the results of which are given in Table 2 under POM-4.

The melt-index given in this Table is determined at 195° C. according to the ASTM method D 1238 57 T and the $K_{220}$ value (0.14) relating to POM-3 was recorded up to a total loss of 3.9% by weight.

Moreover, by $D_{220}$ is meant the thermal degradation in air at 220° C., that is the percentage loss of weight after 10 and 20 minute periods, measured with a thermobalance; the passage of air ensures the continuous purging of the volatile degradation products.

Table 2

|       | $\eta e$ (dl/g) | Melt-Index (g/10 minutes) | $K_{220}$ (%/min.) | $D_{220}$ (10') | $D_{220}$ (20') | ASF(%) |
|-------|---------|---------------------------|-------------|-------|-------|--------|
| POM-3 | 1.21    | 23 (bubbly product)       | 0.14 0.05 thereafter | >5    | —     | 93.8   |
| POM-4 | 1.22    | 19.5                      | 0.01        | 0.2   | 0.4   | ≧99.8  |

The granular polymer POM-4 is subjected to a thermal treatment at 230° C. (CR test) in air, using equipment for the determination of the Melt-Index. The granules are loaded into the apparatus and, after various intervals of time, the Melt-Index is determined under a load of 2160 g.

It is thus possible to follow the variation in time of the fluidity, and therefore of the molecular weight, and even of the colour of the extruded polymer.

The results of the test are given in Table 3.

Table 3

| Time(minutes) | Melt-Index (g/10 minutes) | Colour |
|---------------|---------------------------|--------|
| 5             | 25.1                      | white  |
| 10            | 25.0                      | white  |
| 15            | 25.2                      | white  |
| 20            | 25.1                      | white  |
| 25            | 25.3                      | white  |
| 30            | 25.2                      | white  |

EXAMPLE 3

(Comparative)

A polyoxymethylene homopolymer etherified by reaction with triethylorthoformate in the presence of perchloric acid and having an inherent viscosity of 1.44 dl/g, is admixed with 0.5% by weight of polyvinyl pyrrolidone (molecular weight 30,000) and 0.5% by weight of 1,1-di(5'-tert-butyl-4'-hydroxy-2'-methylphenyl)butane.

The mixture, thoroughly homogenized, is extruded in the conditions described in Example 1.

The granules are subjected to tests the results of which are given in Table 4 under POM-6.

EXAMPLE 4

The etherified polyoxymethylene homopolymer of Example 3 is admixed with polyvinyl pyrrolidone and the antioxidant in the same amounts as in Example 3 and also with 2% by weight of the same homopolymer containing 2.5% by weight of sodium chloride. The extrusion is carried out as in Example 1 and the granules are subjected to tests, the results of which are given in Table 4 under POM-7.

In the same table under POM-5 are given the results of some tests carried out on the untreated polymer.

Table 4

|  | Colour | $\eta e$ (dl/g) | Melt-Index (195° C.-g/10′) | $K_{220}$ (%/min.) | $D_{220}$ (10′) | $D_{220}$ (20′) | ASF (%) |
|---|---|---|---|---|---|---|---|
| POM-5 | — | 1.44 | — | — | — | — | 79.5 |
| POM-6 | white-grey | 1.45 | 11(bubbly product) | 0.19 | 2.5 | 6.2 | 83 |
| POM-7 | white | 1.45 | 9.0 | 0.016 | 0.15 | 0.3 | ≧99.8 |

EXAMPLE 5
(Comparative)

A polyoxymethylene homopolymer etherified by reaction with trimethyl orthobenzoate in the presence of sulphuric acid and having an inherent viscosity of 1.64 dl/g, is admixed with 0.4% by weight of 2,2′-methylene-bis(6-tert-butyl-4-methylphenol). The mixture is extruded as in Example 1. In the zone following the first degassing zone there is introduced a quantity equal to 2% by weight of the said polymer of a methanol solution containing 15% by weight of a terpolyamide obtained by copolymerizing hexamethylenediamine adipate, ε-caprolactam and hexamethylenediamine sebacate in a weight ratio of 35:35:30.

The results of the tests carried out on the resulting granules are given in Table 5 under POM-9.

EXAMPLE 6

The etherified polyoxymethylene homopolymer of Example 5, in powdered form, is admixed with 0.4% by weight of 2,2′-methylene-bis (6-tert-butyl-4-methylphenol) and 1% by weight of a mixture of the said homopolymer with 0.20% by weight of potassium fluoride and 0.10% by weight of barium chloride.

The master-batch was previously prepared by dispersing the polymer in the aqueous solution of the halides and bringing it to dryness after filtration.

The blend, thoroughly homogenized, is fed into the twin-screw extruder of Example 1 and treated under the conditions of the said Example 1.

Moreover, in the zone following the first degassing zone there is introduced a quantity equal to 2% by weight of the polymer, of a methanol solution containing 15% by weight of the terpolyamide described in Example 5.

The results of the tests carried out on the granules produced are given in Table 5 under POM-10.

In the same Table under POM-8 are given the values of some characteristics of the untreated etherified polyoxymethylene.

Table 5

|  | Colour | $\eta e$ (dl/g) | Melt-Index (195° C.-g/10) | $K_{220}$ (%/min.) | $D_{220}$ (10′) | $D_{220}$ (20′) | AFS(%) |
|---|---|---|---|---|---|---|---|
| POM-8 | — | 1.64 | — | — | — | — | 92.0 |
| POM-9 | white-grey | 1.63 | 6.5 (bubbly product) | 0.10 | 2.0 | 4.5 | 95.5 |
| POM-10 | white | 1.64 | 6.0 | 0.01 | 0.1 | 0.3 | ≧99.8 |

EXAMPLE 7

A polyoxymethylene homopolymer in powder form etherified by reaction with triethyl orthoformate in the presence of diethyletherated boron trifluoride, having an inherent viscosity of 1.84 dl/g, is suspended in an aqueous solution containing 0.020% by weight of potassium fluoride.

Filtration is carried out and the polymer, which contains 24.0% by weight of volatile solvent (water), is dried up to a water content of 0.05% by weight. The content of potassium fluoride in the dried product is 0.0048% by weight. The said dried product is admixed with 0.35% by weight of pentaerythritol tetra [3-(3′,5′-di-tert-butyl-4′-hydroxyphenyl) propionate] and 0.10% by weight of dicyandiamide.

After thorough homogenisation, the blend is extruded under the conditions of Example 1.

The granules are subjected to the tests, the results of which are given in Table 6 under POM-12.

In the same Table under POM-11 are given the values of some determinations carried out on the untreated polymer in powder form.

Table 6

|  | $\eta e$ (dl/g) | Melt-Index (195° C.-g/10′) | $K_{220}$ (%/min.) | $D_{220}$ (10′) | $D_{220}$ (20′) | ASF (%) |
|---|---|---|---|---|---|---|
| POM-11 | 1.82 | — | 0.17 | — | — | 85.2 |
| POW-12 | 1.82 | 1.85 | 0.02 | 0.2 | 0.3 | ≧99.8 |

The polymer POM-12 is subjected to the thermal treatment at 230° C. (CR test) described in Example 2. The results are given in Table 7.

Table 7

| Time (min.) | Melt-Index(g/10′) | Colour |
|---|---|---|
| 5 | 3.1 | white |
| 10 | 3.1 | white |
| 15 | 3.2 | white |
| 20 | 3.0 | white |
| 25 | 3.1 | white |
| 30 | 3.1 | white |

We claim:
1. A process for eliminating the unstable polyoxymethylene chains of an etherified acetal homopolymer, characterized by heat-treating said homopolymer in the molten state at a temperature of at least 180° C., in the presence of one or more halides of alkali metals and alkaline earth metals, for a period such as to ensure substantially complete degradation of said unstable chains, wherein no more than 5% by weight of water is present.

2. The process of claim 1, in which the heat-treatment is carried out at least in part under subatmospheric pressure to facilitate removal of the volatile degradation products.

3. The process of claim 1, in which the heat-treatment is carried out under stirring.

4. The process of claim 1, in which the heat-treatment is carried out at a temperature of from 180° to 260° C.

5. The process of claim 1, in which the heat-treatment is carried out at a temperature of from 180° to 230° C.

6. The process of claim 1, wherein said halides are selected from the group consisting of fluorides and chlorides of lithium, sodium, potassium and barium.

7. The process of claim 1, wherein said halides are used in an amount of from 0.0002 to 0.5 wt.% with respect to the etherified acetal homopolymer.

8. The process of claim 1, wherein said halides are used in an amount of from 0.001 to 0.05 wt.% with respect to the etherified acetal hompolymer.

9. The process of claim 1, in which the heat-treatment is carried out by extruding the homopolymer in a one-screw or a twin-screw extruder, one or more zones at subatmospheric pressure being established along the body of the extruder.

10. The process of claim 1, in which the etherified acetal homopolimer is brought to the molten state in a period of from 1 to 60 seconds.

11. The process of claim 2, wherein said subatmospheric pressure is from 15 to 700 mm Hg.

12. The process of claim 1, in which said halides are added to, and admixed with said homopolymer before bringing the latter to the molten state.

13. The process of claim 1, in which said halides are added to, and admixed with said homopolymer once the latter is in the molten state.

14. The process of claim 2, wherein any water present is removed with said volatile degradation products.

15. The process of claim 1, wherein the amount of water is not greater than 1%.

16. The process of claim 2, in which the heat-treatment is carried out at a temperature of from 180° to 260° C.

* * * * *